United States Patent

Ferrante et al.

[11] Patent Number: 5,933,273
[45] Date of Patent: Aug. 3, 1999

[54] ULTRAVIOLET BLOCKING COATING AND ASSOCIATED COATED OPTICAL ELEMENT

[75] Inventors: Ronald Alfred Ferrante, Corona, Calif.; Rudolf Herman Ott, Batchtown, Ill.

[73] Assignee: McDonnell Douglas Corporation, St. Louis, Mo.

[21] Appl. No.: 08/872,536

[22] Filed: Jun. 11, 1997

[51] Int. Cl.$^6$ ............................... F21V 9/04; G02B 1/10; G02B 5/28
[52] U.S. Cl. .................... 359/359; 359/589; 359/586; 359/588; 359/581
[58] Field of Search .................... 359/359, 589, 359/586, 588, 581

[56] References Cited

U.S. PATENT DOCUMENTS

4,931,315  6/1990  Mellor ..................................... 359/359
5,412,274  5/1995  Parham ..................................... 359/586

*Primary Examiner*—Cassandra Spyrou
*Assistant Examiner*—Jennifer Winstedt
*Attorney, Agent, or Firm*—Alston & Bird LLP

[57] ABSTRACT

The UV blocking coating includes at least eight alternating layers of a first dielectric material and a second dielectric material stacked upon the surface of an optical substrate to thereby form windows, windscreens, lenses or the like. The first dielectric material has a higher index of refraction then the second dielectric material. For example, the first dielectric material can be $TiO_2$, $ZrO_2$ and $Ta_2O_5$ and the second dielectric material can be $MgF_2$ or $SiO_2$. In addition, each layer of the second dielectric material has an optical thickness which is greater than the optical thickness of the underlying layer of the first dielectric material upon which the layer of the second dielectric material is stacked. As a result of the unique construction of the UV blocking coating, the reflectance of the UV blocking coating varies dramatically upon exposure to UV light on the one hand and to visible light on the other hand. In particular, the reflectance of the UV blocking coating as a function of wavelength defines a high reflectance region in which greater than 90% and, more typically, greater than 95% of UV light having a wavelength of 350 nm to 400 nm is reflected and a low reflectance region in which less than 5% and, more commonly, less than 2% of visible light having a wavelength of 450 nm to 700 nm is reflected.

21 Claims, 3 Drawing Sheets

ULTRAVIOLET BLOCKING COATING AND ASSOCIATED COATED OPTICAL ELEMENT

BACKGROUND OF THE INVENTION

The present invention relates generally ultraviolet (UV) blocking coatings and, more particularly, to UV blocking coatings for reflecting UV light while concurrently reducing reflections of visible light from the surface of an optical substrate, such as a window, a windscreen or an eyeglass lens.

Exposure to UV light, such as the UV light present in sunlight, can cause a variety of problems. For example, UV light can cause plastic materials, such as acrylic and polycarbonate materials, to craze as a result of photoinduced chemical crosslinking. Thus, plastic windows which are exposed to UV light will generally develop a network of fine cracks as a result of the photoinduced chemical crosslinking. Moreover, exposure to UV light can lead, at least in part, to the formation of cataracts in the eye and can create cellular damage in plants which, in turn, retards the growth rate of the plants. Further, the exposure of the carpeting and upholstery within buildings or vehicles will generally cause the dyes in the carpeting and upholstery to fade over time. Thus, the interior of a vehicle, such as a train, bus, automobile or the like, will typically fade over time.

In an attempt to reduce the deleterious effects of exposure to UV light, plastic windows and lenses have been designed which include chemical UV absorbers, such as organic dyes. The chemical UV absorbers are added to the plastic material in order to reduce, but not eliminate UV-induced damage. For example, vehicles and buildings, such as greenhouses, can include plastic windows which include chemical UV absorbers in order to reduce the UV-induced damage. In addition, plastic eyeglass lenses can include chemical UV absorbers in order to slow the formation of cataracts.

While plastic windows or lenses which include chemical UV absorbers reduce the resulting UV-induced damage, the overall transmittance of the plastic window or lens is typically reduced slightly in comparison to conventional plastic windows or lenses which do not include chemical UV absorbers. As a result, plastic windows which include chemical UV absorbers will also tend to attenuate light, such as visible light, outside of the UV spectrum. In addition, plastic windows which include chemical UV absorbers also generally have a yellow tint which may be unacceptable for certain applications. Moreover, plastic windows which include chemical UV absorbers typically cost significantly more than conventional plastic windows which do not include chemical UV absorbers.

SUMMARY OF THE INVENTION

The UV blocking coating of the present invention includes at least eight alternating layers of a first dielectric material and a second dielectric material stacked upon a surface of an optical substrate. The first dielectric material has a higher index of refraction then the second dielectric material. In addition, each layer of the second dielectric material has an optical thickness which is greater than the optical thickness of the underlying layer of the first dielectric material upon which the layer of the second dielectric material is stacked. As a result of the unique construction of the UV blocking coating, the reflectance of the UV blocking coating varies dramatically upon exposure to UV light on the one hand and to visible light on the other hand. In particular, the reflectance of the UV blocking coating as a function of wavelength defines a high reflectance region in which greater than 90% and, more preferably, greater than 95% of UV light having a wavelength of 350 nm to 400 nm is reflected and a low reflectance region in which less than 5% and, more preferably, less than 2% of visible light having a wavelength of 450 nm to 700 nm is reflected.

According to one advantageous embodiment, the first dielectric material is $TiO_2$ and the second dielectric material is $MgF_2$. More broadly speaking, the first dielectric material is preferably either $TiO_2$, $ZrO_2$ or $Ta_2O_5$, while the second dielectric material is either $MgF_2$ or $SiO_2$. In any event, the alternating layers of the first and second dielectric materials can be stacked upon the first surface of an optical substrate to form an optical element which reflects a high percentage of UV light and which transmits a high percentage of visible light. For example, windows, windscreens, lenses and the like can be formed according to the present invention. The optical substrate can also be formed of any one of variety of materials, such as glass, plastic or metal. According to one embodiment, however, the index of refraction of the optical substrate is between the respective indices of refraction of the first and second dielectric materials.

Preferably, the $i^{th}$ layer of the UV blocking coating stacked upon the surface of the optical substrate has an optical thickness which is greater than the optical thickness of the $(i-4)^{th}$ layer for a positive integer i of 5, 7, 9 or 11. More preferably, both the $i^{th}$ layer and the $(i-4)^{th}$ layer are each formed of the first dielectric material, such as $TiO_2$. The UV blocking coating of one advantageous embodiment includes an odd number of alternating layers, such as thirteen alternating layers of the first and second dielectric materials. According to this embodiment, both the innermost layer and outermost layer are formed of the first dielectric material. In addition, the outermost layer of the UV blocking coating of this embodiment also preferably has an optical thickness which is less than the corresponding optical thickness of any of the other layers of the first and second dielectric materials.

In one particularly advantageous embodiment, the UV blocking coating is formed of thirteen alternating layers of $TiO_2$ and $MgF_2$. According to this embodiment, each of the thirteen layers has a preferred range of optical thicknesses as well as a specific optical thickness within the preferred range which is most desirable as defined below.

| Layer | Material | Preferred Range of Optical Thickness | Preferred Optical Thickness |
|---|---|---|---|
| 1 | $TiO_2$ | $\frac{0.2\lambda_0}{4n}$ to $\frac{0.4\lambda_0}{4n}$ | $\frac{0.33\lambda_0}{4n}$ |
| 2 | $MgF_2$ | $\frac{0.4\lambda_0}{4n}$ to $\frac{0.6\lambda_0}{4n}$ | $\frac{0.49\lambda_0}{4n}$ |
| 3 | $TiO_2$ | $\frac{0.4\lambda_0}{4n}$ to $\frac{0.6\lambda_0}{4n}$ | $\frac{0.51\lambda_0}{4n}$ |
| 4 | $MgF_2$ | $\frac{0.5\lambda_0}{4n}$ to $\frac{0.7\lambda_0}{4n}$ | $\frac{0.60\lambda_0}{4n}$ |
| 5 | $MgF_2$ | $\frac{0.4\lambda_0}{4n}$ to $\frac{0.6\lambda_0}{4n}$ | $\frac{0.49\lambda_0}{4n}$ |

-continued

| Layer | Material | Preferred Range of Optical Thickness | Preferred Optical Thickness |
|---|---|---|---|
| 6 | $MgF_2$ | $\frac{0.5\lambda_0}{4n}$ to $\frac{0.7\lambda_0}{4n}$ | $\frac{0.58\lambda_0}{4n}$ |
| 7 | $MgF_2$ | $\frac{0.4\lambda_0}{4n}$ to $\frac{0.6\lambda_0}{4n}$ | $\frac{0.52\lambda_0}{4n}$ |
| 8 | $MgF_2$ | $\frac{0.5\lambda_0}{4n}$ to $\frac{0.7\lambda_0}{4n}$ | $\frac{0.63\lambda_0}{4n}$ |
| 9 | $TiO_2$ | $\frac{0.4\lambda_0}{4n}$ to $\frac{0.6\lambda_0}{4n}$ | $\frac{0.49\lambda_0}{4n}$ |
| 10 | $MgF_2$ | $\frac{0.4\lambda_0}{4n}$ to $\frac{0.6\lambda_0}{4n}$ | $\frac{0.54\lambda_0}{4n}$ |
| 11 | $TiO_2$ | $\frac{0.4\lambda_0}{4n}$ to $\frac{0.6\lambda_0}{4n}$ | $\frac{0.53\lambda_0}{4n}$ |
| 12 | $MgF_2$ | $\frac{0.7\lambda_0}{4n}$ to $\frac{0.9\lambda_0}{4n}$ | $\frac{0.79\lambda_0}{4n}$ |
| 13 | $TiO_2$ | $\frac{0.1\lambda_0}{4n}$ to $\frac{0.3\lambda_0}{4n}$ | $\frac{0.15\lambda_0}{4n}$ |

The UV blocking coating of this embodiment is designed to preferentially reduce the reflection of visible light having a predetermined wavelength $\lambda_0$ in air. Thus, the optical thickness of each layer depends, at least in part, upon the index of refraction n of the respective material and the predetermined wavelength $\lambda_0$ for which the UV blocking coating is designed to reduce the reflections.

The UV blocking coating therefore blocks UV light to reduce, if not eliminate, the deleterious effects of exposure to UV light. By reflecting a high percentage of UV light, such as greater than 99% of the UV light, the UV blocking coating and the optical substrate upon which the UV blocking coating is disposed is not heated and, as a result, does not suffer from the disadvantageous effects introduced by heating. In addition to reflecting a high percentage of UV light, the UV blocking coating of the present invention also improves the transmittance of visible light by the coated optical element by effectively serving as an anti-reflectance coating. Moreover, the UV blocking coating is durable and environmentally stable and is relatively inexpensive in comparison with plastic windows which include chemical UV absorbers. Further, optical elements coated with the UV blocking coating of the present invention have a nearly neutral color which is acceptable for most, if not all, applications.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In addition, the thicknesses of the various layers have been exaggerated in the drawings for purposes of clarity.

Figure 1:
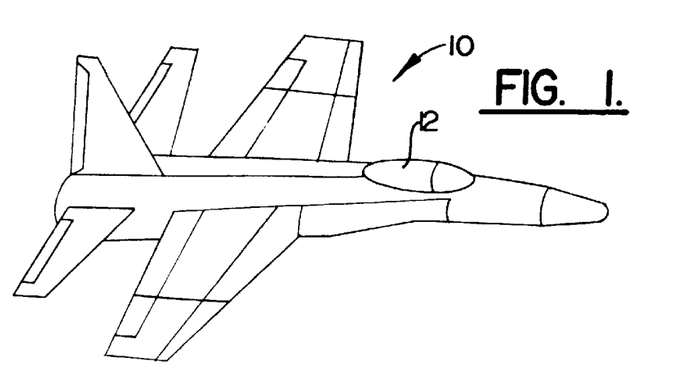
FIG. 1 is a perspective view of an aircraft having a windscreen which includes the UV blocking coating of one embodiment of present invention.

FIG. 1 illustrates a perspective view of an aircraft 10 having a windscreen 12 which is coated with an ultraviolet (UV) blocking coating 16 according to the present invention. However, the UV blocking coating can coat a variety of optical substrates 14 other than to aircraft windscreens, such as the windows in a building, greenhouse, vehicle or the like or the lenses in eyeglasses or other optical devices. In addition, the UV blocking coating can coat optical substrates formed of a variety of materials, such as glass, plastics or metals. For example, the UV blocking coating of the present invention can coat plastic substrates, such as acrylic or polycarbonate plastic substrates including, but not limited to, LEXAN™ polycarbonate plastic substrates. In addition, the UV blocking coating can coat metal substrates, such as aluminum substrates, without departing from the spirit and scope of the present invention.

Figure 2:
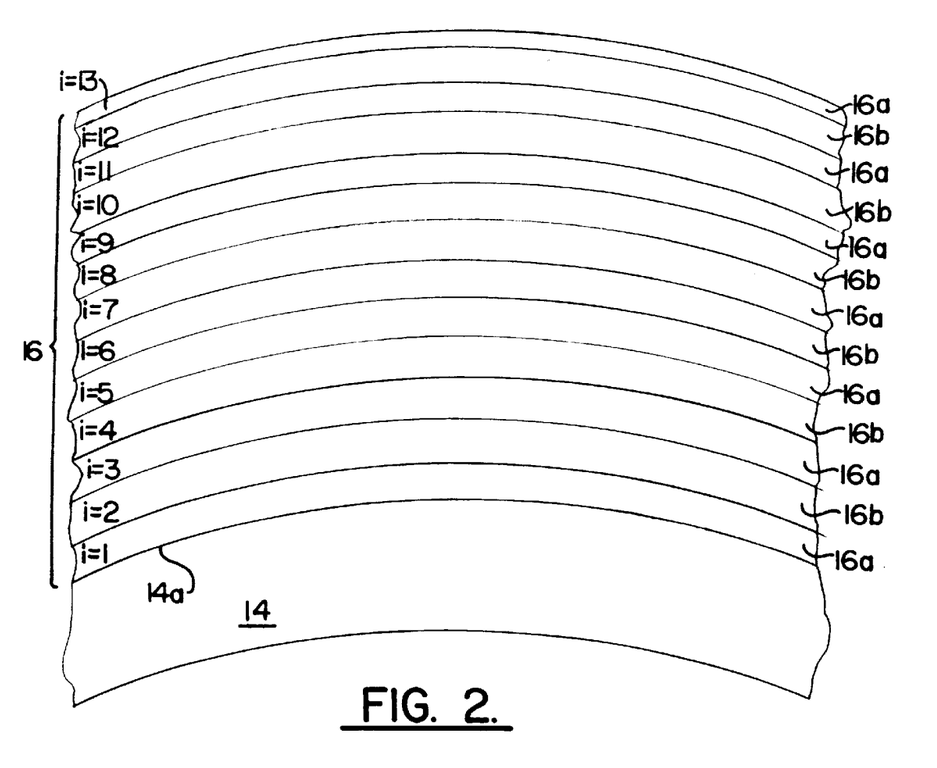
FIG. 2 is a cross-sectional view of a portion of the windscreen of FIG. 1 which illustrates the alternating layers of the first and second dielectric materials stacked upon the surface of the windscreen according to one embodiment of the present invention.

Referring now to FIG. 2, a portion of an optical element, such as a windscreen 12, according to one embodiment of the present invention is illustrated. The optical element includes a substrate 14, such as a glass, plastic or metal substrate, which is coated with the UV blocking coating 16 in order to reflect a high percentage of UV light while concurrently reducing reflections of visible light from the optical substrate. The UV blocking coating includes a number of alternating layers of a first dielectric material 16a and a second dielectric material 16b stacked upon a first surface 14a of the optical substrate. The UV blocking coating generally includes at least eight and, more preferably, at least ten alternating layers of the first and second dielectric materials.

The various layers of the first and second dielectric materials can be deposited upon the first surface 14a of the optical substrate 14 in a variety of manners as known to those skilled in the art. For example, the UV blocking coating 16 can be deposited upon a glass substrate by means of evaporative coating in which the temperature is held at least as high as 300° C. in order to obtain a relatively hard UV coating. Alternatively, the UV blocking coating can be deposited upon a plastic substrate by means of ion assisted deposition, ion plating or similar processes known to those skilled in the art.

The first dielectric material 16a has a higher index of refraction then the second dielectric material 16b. Moreover, the UV blocking coating 16 of the present invention typically blocks a broader spectrum of UV light as the difference between the respective indices of refraction of the first and second dielectric materials increases. Therefore, the UV blocking properties of the coating of the present invention can be tailored by selecting the first and second dielectric materials to have respective indices of refraction which differ by a desired amount.

According to one advantageous embodiment, for example, the first dielectric material is titanium oxide $TiO_2$ having an index of refraction of 2.49 and the second dielectric material is magnesium fluoride $MgF_2$ having an index of refraction of 1.38–1.39. Alternatively, the first dielectric material can be formed of either zirconium oxide $ZrO_2$ or tantalum oxide $Ta_2O_5$ having an index of refraction of 2.15–2.25 and the second dielectric material can be formed of silicon dioxide $SiO_2$ having an index of refraction of about 1.49. In either embodiment, the first dielectric material preferably has an index of refraction which exceeds the index of refraction of the second dielectric material by at least 0.5 and, more preferably, by at least 0.7.

The respective optical thickness of each layer of the UV blocking coating 16 is generally different than the optical thickness of any other layer of the UV blocking coating. In this regard, each layer formed by the second dielectric material 16b has an optical thickness which is greater than the optical thickness of the underlying layer of the first dielectric material 16a upon which the layer of the second material is stacked. In addition, the $i^{th}$ layer stacked upon the surface 14a of the optical substrate 14 preferably has an optical thickness which is greater than the optical thickness of the $(i-4)^{th}$ layer stacked upon the surface of the optical substrate for a positive integer i of 5, 7, 9 or 11. Thus, the fifth layer has an optical thickness greater than the first layer, the seventh layer has an optical thickness greater than the third layer, the ninth layer has an optical thickness greater than the fifth layer, and the eleventh layer has an optical thickness greater than the seventh layer. For reference purposes, the various layers of the UV blocking coating depicted in cross-section in FIG. 2 are designated by the corresponding integer i.

Since the UV blocking coating 16 is formed of alternating layers of the first and second dielectric materials and since the first layer (i=1), i.e., the layer adjacent to the optical substrate, is formed of the first dielectric material,(each layer designated by an odd integer i, such as the first, third, fifth, seventh, ninth and eleventh layers of the UV blocking coating, are formed of the first dielectric material 16a) Correspondingly, each layer of the UV blocking coating designated by an even integer i, such as the second, fourth, sixth, eighth, tenth and twelfth layers, are formed of the second dielectric material 16b.

The UV blocking coating 16 is preferably formed of an odd number of alternating layers of the first and second dielectric materials. As such, the first dielectric material 16a generally forms both the innermost layer, i.e., the first layer, and the outermost layer. As shown in FIG. 2, the outermost layer can have an optical thickness which is less than the corresponding optical thickness of any of the other layers of the UV blocking coating. As a result of the construction of the UV blocking coating of the present invention, the UV blocking coating is durable and environmentally stable and need not be covered with a protecting coating.

According to one advantageous embodiment shown generally in FIG. 2, the UV blocking coating 16 is formed of thirteen alternating layers of $TiO_2$ and $MgF_2$ stacked upon the surface 14a of the optical substrate 14. The UV blocking coating is designed to preferentially reduce the reflections of visible light having a predetermined wavelength $\lambda_o$ in air. As such, the respective optical thickness of each dielectric layer is dependent, at least in part, upon the predetermined wavelength $\lambda_o$ of visible light which the UV blocking coating is designed to preferentially transmit and the respective index of refraction n of the first and second dielectric materials. According to this advantageous embodiment, each of the thirteen alternating layers of $TiO_2$ and $MgF_2$ has a preferred range of optical thicknesses and a specific optical thickness within the range which is preferred as defined below.

TABLE 1

| Layer | Material | Preferred Range of Optical Thickness | Preferred Optical Thickness |
|---|---|---|---|
| 1 | $TiO_2$ | $\frac{0.2\lambda_0}{4n}$ to $\frac{0.4\lambda_0}{4n}$ | $\frac{0.331\lambda_0}{4n}$ |
| 2 | $MgF_2$ | $\frac{0.4\lambda_0}{4n}$ to $\frac{0.6\lambda_0}{4n}$ | $\frac{0.492\lambda_0}{4n}$ |
| 3 | $TiO_2$ | $\frac{0.4\lambda_0}{4n}$ to $\frac{0.6\lambda_0}{4n}$ | $\frac{0.513\lambda_0}{4n}$ |
| 4 | $MgF_2$ | $\frac{0.5\lambda_0}{4n}$ to $\frac{0.7\lambda_0}{4n}$ | $\frac{0.604\lambda_0}{4n}$ |
| 5 | $MgF_2$ | $\frac{0.4\lambda_0}{4n}$ to $\frac{0.6\lambda_0}{4n}$ | $\frac{0.487\lambda_0}{4n}$ |
| 6 | $MgF_2$ | $\frac{0.5\lambda_0}{4n}$ to $\frac{0.7\lambda_0}{4n}$ | $\frac{0.582\lambda_0}{4n}$ |
| 7 | $MgF_2$ | $\frac{0.4\lambda_0}{4n}$ to $\frac{0.6\lambda_0}{4n}$ | $\frac{0.519\lambda_0}{4n}$ |
| 8 | $MgF_2$ | $\frac{0.5\lambda_0}{4n}$ to $\frac{0.7\lambda_0}{4n}$ | $\frac{0.628\lambda_0}{4n}$ |
| 9 | $TiO_2$ | $\frac{0.4\lambda_0}{4n}$ to $\frac{0.6\lambda_0}{4n}$ | $\frac{0.488\lambda_0}{4n}$ |
| 10 | $MgF_2$ | $\frac{0.4\lambda_0}{4n}$ to $\frac{0.6\lambda_0}{4n}$ | $\frac{0.535\lambda_0}{4n}$ |
| 11 | $TiO_2$ | $\frac{0.4\lambda_0}{4n}$ to $\frac{0.6\lambda_0}{4n}$ | $\frac{0.526\lambda_0}{4n}$ |
| 12 | $MgF_2$ | $\frac{0.7\lambda_0}{4n}$ to $\frac{0.9\lambda_0}{4n}$ | $\frac{0.785\lambda_0}{4n}$ |
| 13 | $TiO_2$ | $\frac{0.1\lambda_0}{4n}$ to $\frac{0.3\lambda_0}{4n}$ | $\frac{0.154\lambda_0}{4n}$ |

As listed above, the optical thickness of each dielectric layer is expressed as a fractional amount of a quarter wavelength. Typically, the UV blocking coating 16 is designed to preferentially reduce the reflections of visible light of having a wavelength of approximately 600 nm, i.e. $\lambda_0$=600 nm. However, the UV blocking coating can be designed to preferentially reduce the reflections of visible light having other wavelengths within the visible spectrum without departing from the spirit and scope of the present invention.

Figure 3:
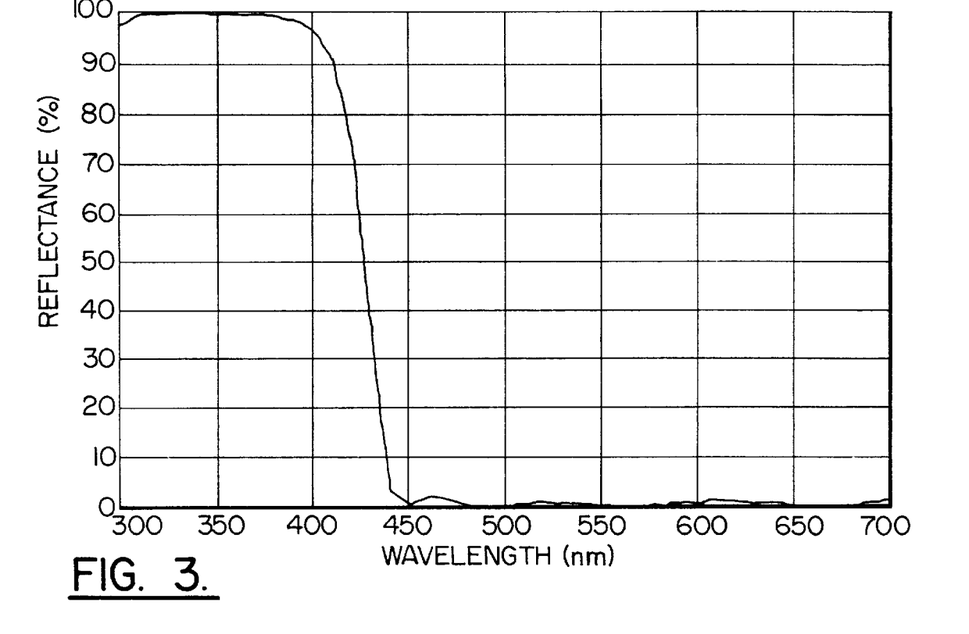
FIG. 3 is a graph illustrating the reflectance of a plastic substrate coated with the UV blocking coating according to one embodiment of the present invention as a function of wavelength.
Figure 4:
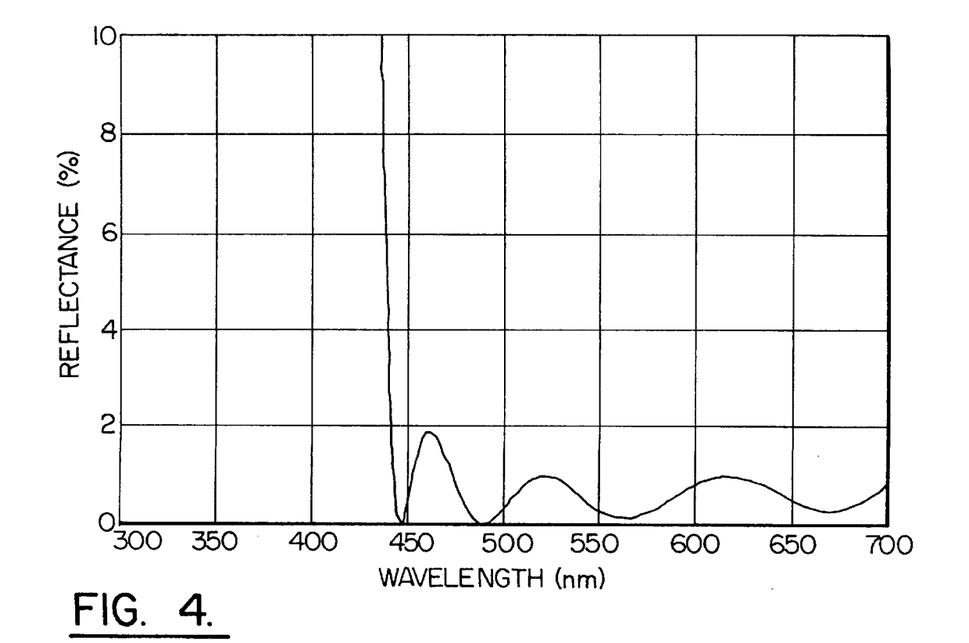
FIG. 4 is a portion of the graph of FIG. 3 in which the scale has been expanded to more clearly illustrate the reduction in the reflectance of visible light by the UV blocking coating according to one embodiment of the present invention.

By way of further example, the UV blocking coating 16 described above in Table 1 can be disposed upon an optical substrate 14 formed of polycarbonate plastic in order to reflect at least 95% and, more typically, at least 99% of the UV light having wavelengths between 350 nm and 400 nm. See, for example, FIG. 3. In addition, this exemplary UV blocking coating reduces the reflectance of visible light having a wavelength between 400 nm and 700 nm to a relatively constant percentage of less than 2% and, more generally, less than 1%. See, for example, FIG. 4 in which a portion of FIG. 3 is enlarged to more clearly illustrate the low levels of reflectance for visible light.

By coating both sides of an optical element, such as a window, the UV blocking coating 16 described by Table 1 blocks nearly 99.9% of the UV light, while significantly reducing the reflections of visible light from the optical element. In this regard, a bare, uncoated polycarbonate substrate generally reflects about 4% of the visible light, while a polycarbonate substrate coated with the UV blocking coating of the present invention generally reflects less than 1% of the visible light incident thereon. In addition, the UV blocking coating eliminates ghost images created by multiple reflections from an uncoated substrate.

Figure 5:
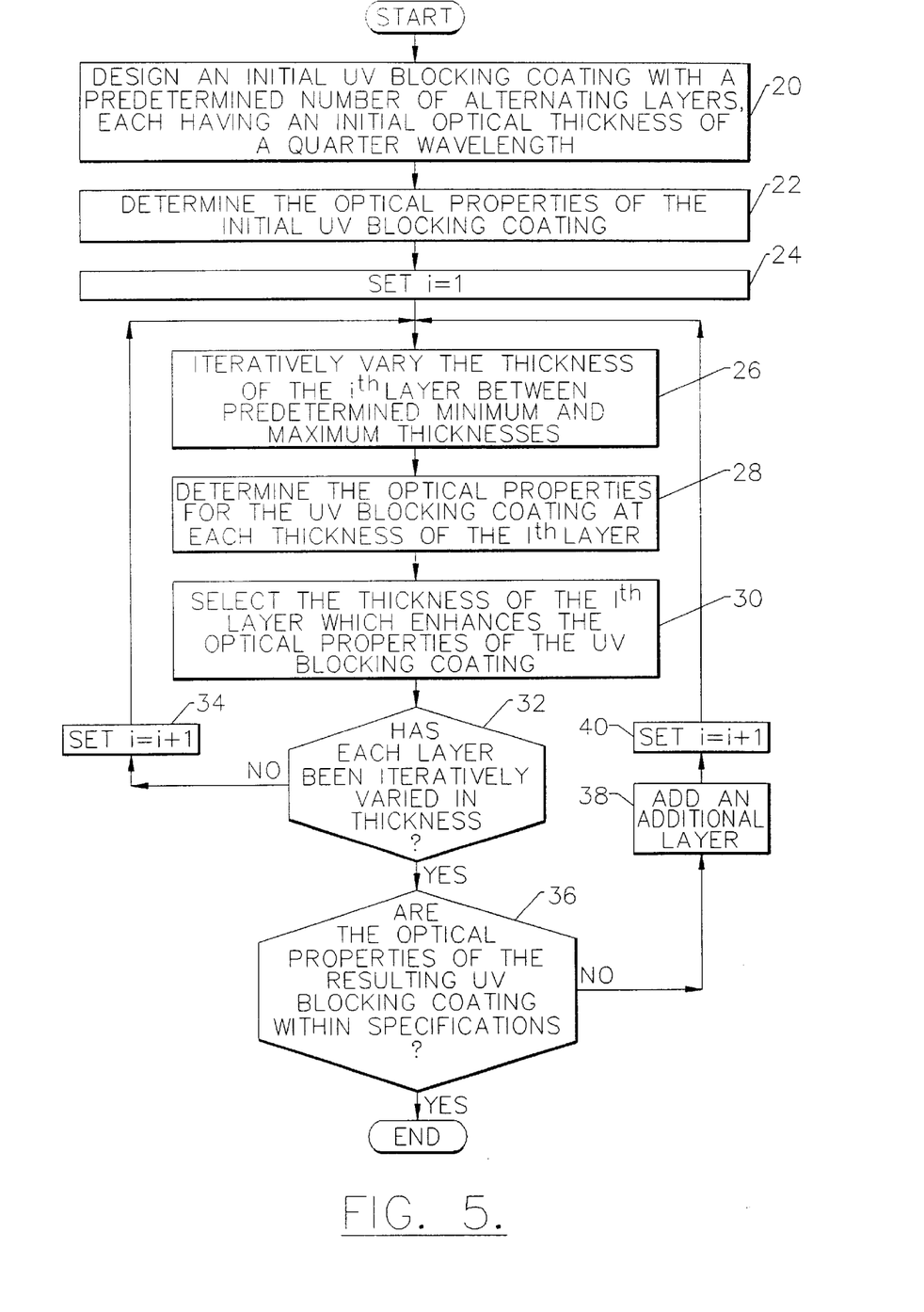
FIG. 5 is a flow chart illustrating the operations performed to coat an optical substrate with a UV blocking coating according to one embodiment of the present invention.

The UV blocking coating 16 of the present invention can be designed in many manners. For purposes of example, however, one advantageous method for designing a UV blocking coating is depicted in FIG. 5 and described hereinbelow.

As shown in block 20, an initial UV blocking coating 16 having a stack of a predetermined number, such as eight or ten alternating layers of the first and second dielectric materials can be simulated. According to this initial design, each layer of dielectric material has an optical thickness of a quarter wavelength, i.e., $\lambda_0/4n$. As shown in block 22, the optical properties of the initial UV blocking coating are then determined, such as by simulation. In particular the reflectance of UV light by the initial UV blocking coating and the reflectance or, alternatively, the transmittance of visible light by the UV blocking coating are then determined. As known to those skilled in the art, the optical properties of a stack of dielectric layers, such as the UV blocking coating of the present invention, can be simulated by means of Filmshow Software available from FTG Software Associates of Princeton, N.J.

Based upon the optical properties of the initial stack of dielectric layers, such as the reflectance of UV light by the initial stack of dielectric layers and the transmittance of visible light by the initial stack of dielectric layers, the respective optical thickness of each of the dielectric layers can be iteratively adjusted (one layer at a time) and the optical properties of the adjusted stack of dielectric layers can be redetermined, such as by means of the Filmshow Software. See blocks 24–28. For each dielectric layer, the optical thickness of the dielectric layer is selected which enhances the optical properties of the UV blocking coating, i.e., the reflectance of UV light and the transmittance of visible light. See block 30.

Once the thickness of each of the dielectric layers of the initial UV blocking coating 16 has been iteratively adjusted, the optical properties of the resulting UV blocking coating are compared to a predetermined set of specifications, typically defined at least in part, by the percentage of UV light reflected and the percentage of visible light transmitted by the UV blocking coating. See blocks 32–36. If the optical properties of the resulting UV blocking coating are within specifications, the design process can be terminated. If, however, the optical properties of the resulting UV blocking coating are not yet within specifications, one or more additional dielectric layers formed alternately of the first and second dielectric materials can be added to the stack. See blocks 38 and 40. As described above, the thickness of each of these additional layers can also be iteratively adjusted to enhance the optical properties of the resulting UV blocking coating. Once the optical properties of the resulting stack of dielectric layers, including the reflectance of UV light by the UV blocking coating and the transmittance of visible light by the UV blocking coating, meets or exceeds the requirements for a particular application, the design of the UV blocking coating is complete.

As described above, the UV blocking coating 16 blocks UV light so as to significantly reduce the deleterious effects of exposure to UV light. By reflecting a high percentage of UV light, such as typically greater than 99% of UV light, the UV blocking coating as well as the optical substrate 14 upon which the UV blocking coating is disposed is not heated and, as a result, does not suffer from the disadvantageous effects caused by heating. In addition to reflecting a high percentage of UV light, the UV blocking coating of the present invention also improves the transmittance of visible light by coated optical elements by effectively serving as an antireflectance coating. Moreover, the UV blocking coating is durable and environmentally stable and is relatively inexpensive in comparison with plastic windows which include chemical UV absorbers. Further, optical elements coated with the UV blocking coating of the present invention have a nearly neutral color which is acceptable for most, if not all applications.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An ultraviolet (UV) blocking coating for reflecting UV light while concurrently reducing reflections of visible light from a surface of an optical substrate, the UV blocking coating comprising:

at least eight alternating layers of a first dielectric material and a second dielectric material stacked upon the surface of the optical substrate, wherein the first dielectric material has a higher index of refraction than the second dielectric material, and wherein each layer of the second dielectric material has an optical thickness which is greater than the optical thickness of the underlying layer of the first dielectric material upon which the layer of the second dielectric material is stacked, said optical thicknesses being selected to establish a high reflectance region in which greater than 95% of UV light having a wavelength of 350 nm to 400 nm is reflected and a low reflectance region in which less than 2% of visible light having a wavelength of 450 nm to 700 nm is reflected.

2. A UV blocking coating according to claim 1 wherein an $i^{th}$ layer stacked upon the surface of the optical substrate has an optical thickness which is greater than the optical thickness of an $(i-4)^{th}$ layer stacked upon the surface of the optical substrate for a positive integer i of 5, 7, 9 and 11.

3. A UV blocking coating according to claim 2 wherein the $i^{th}$ layer and the $(i-4)^{th}$ layer are each comprised of the first dielectric material.

4. A UV blocking coating according to claim 1 wherein said at least eight alternating layers comprises an odd number of alternating layers of the first dielectric material and the second dielectric material such that both the innermost layer and the outermost layer are comprised of the first dielectric material.

5. A UV blocking coating according to claim 4 wherein the outermost layer has an optical thickness which is less than the corresponding optical thickness of any of the other layers of the first and second dielectric materials.

6. A UV blocking coating according to claim 1 wherein the first dielectric material is selected from the group consisting of $TiO_2$, $ZrO_2$ and $Ta_2O_5$, and wherein the second dielectric material is selected from the group consisting of $MgF_2$ and $SiO_2$.

7. An ultraviolet (UV) blocking coating for reflecting UV light while concurrently reducing reflections of visible light from a surface of an optical substrate, the UV blocking coating comprising:

at least ten alternating layers of $TiO_2$ and $MgF_2$ stacked upon the surface of the optical substrate, wherein $TiO_2$ has a higher index of refraction than $MgF_2$, and wherein each layer of $MgF_2$ has an optical thickness which is greater than the optical thickness of the underlying layer of $TiO_2$ upon which the layer of $MgF_2$ is stacked, said optical thicknesses being selected to establish a high reflectance region in which greater than 90% of UV light having a wavelength of 350 nm to 400 nm is reflected and a low reflectance region in which less than 5% of visible light having a wavelength of 450 nm to 700 nm is reflected.

8. A UV blocking coating according to claim 7 wherein an $i^{th}$ layer stacked upon the surface of the optical substrate has an optical thickness which is greater than the optical thickness of an $(i-4)^{th}$ layer stacked upon the surface of the optical substrate for a positive integer i of 5, 7, 9 and 11.

9. A UV blocking coating according to claim 8 wherein the $i^{th}$ layer and the $(i-4)^{th}$ layer are each ed of $TiO_2$.

10. A UV blocking coating according to claim 7 wherein said at least ten alternating layers comprises an odd number of alternating layers of $TiO_2$ and $MgF_2$ such that both the innermost layer and the outermost layer are comprised of $TiO_2$.

11. A UV blocking coating according to claim 10 wherein the outermost layer has an optical thickness which is less than the corresponding optical thickness of any of the other layers of $TiO_2$ and $MgF_2$.

12. A UV blocking coating according to claim 11 which preferentially reduces the reflection of visible light having a predetermined wavelength $\lambda_0$ in air, wherein said at least ten alternating layers comprises thirteen alternating layers of $TiO_2$ and $MgF_2$ having respective optical thicknesses within the following ranges:

| Layer | Material | Range of Optical Thickness |
|---|---|---|
| 1 | $TiO_2$ | $\frac{0.2\lambda_0}{4n}$ to $\frac{0.4\lambda_0}{4n}$ |
| 2 | $MgF_2$ | $\frac{0.4\lambda_0}{4n}$ to $\frac{0.6\lambda_0}{4n}$ |
| 3 | $TiO_2$ | $\frac{0.4\lambda_0}{4n}$ to $\frac{0.6\lambda_0}{4n}$ |
| 4 | $MgF_2$ | $\frac{0.5\lambda_0}{4n}$ to $\frac{0.7\lambda_0}{4n}$ |
| 5 | $MgF_2$ | $\frac{0.4\lambda_0}{4n}$ to $\frac{0.6\lambda_0}{4n}$ |
| 6 | $MgF_2$ | $\frac{0.5\lambda_0}{4n}$ to $\frac{0.7\lambda_0}{4n}$ |
| 7 | $MgF_2$ | $\frac{0.4\lambda_0}{4n}$ to $\frac{0.6\lambda_0}{4n}$ |
| 8 | $MgF_2$ | $\frac{0.5\lambda_0}{4n}$ to $\frac{0.7\lambda_0}{4n}$ |
| 9 | $TiO_2$ | $\frac{0.4\lambda_0}{4n}$ to $\frac{0.6\lambda_0}{4n}$ |
| 10 | $MgF_2$ | $\frac{0.4\lambda_0}{4n}$ to $\frac{0.6\lambda_0}{4n}$ |
| 11 | $TiO_2$ | $\frac{0.4\lambda_0}{4n}$ to $\frac{0.6\lambda_0}{4n}$ |
| 12 | $MgF_2$ | $\frac{0.7\lambda_0}{4n}$ to $\frac{0.9\lambda_0}{4n}$ |
| 13 | $TiO_2$ | $\frac{0.1\lambda_0}{4n}$ to $\frac{0.3\lambda_0}{4n}$ | wherein n is the index of refraction of the respective material, and wherein the first layer is disposed upon the surface of the optical substrate and the remaining layers are stacked thereupon such that the thirteen layer is the outermost layer.

13. A UV blocking coating according to claim 12 wherein said thirteen alternating layers of $TiO_2$ and $MgF_2$ have the following respective optical thicknesses:

| Layer | Material | Range of Optical Thickness |
|---|---|---|
| 1 | $TiO_2$ | $\dfrac{0.33\lambda_0}{4n}$ |
| 2 | $MgF_2$ | $\dfrac{0.49\lambda_0}{4n}$ |
| 3 | $TiO_2$ | $\dfrac{0.51\lambda_0}{4n}$ |
| 4 | $MgF_2$ | $\dfrac{0.60\lambda_0}{4n}$ |
| 5 | $MgF_2$ | $\dfrac{0.49\lambda_0}{4n}$ |
| 6 | $MgF_2$ | $\dfrac{0.58\lambda_0}{4n}$ |
| 7 | $MgF_2$ | $\dfrac{0.52\lambda_0}{4n}$ |
| 8 | $MgF_2$ | $\dfrac{0.63\lambda_0}{4n}$ |
| 9 | $TiO_2$ | $\dfrac{0.49\lambda_0}{4n}$ |
| 10 | $MgF_2$ | $\dfrac{0.54\lambda_0}{4n}$ |
| 11 | $TiO_2$ | $\dfrac{0.53\lambda_0}{4n}$ |
| 12 | $MgF_2$ | $\dfrac{0.79\lambda_0}{4n}$ |
| 13 | $TiO_2$ | $\dfrac{0.15\lambda_0}{4n}$ |

14. An optical element which reflects a high percentage of UV light and which transmits a high percentage of visible light, the optical element comprising:

an optical substrate having a first surface; and at least eight alternating layers of a first dielectric material and a second dielectric material stacked upon the first surface of said optical substrate, wherein the first dielectric material has a higher index of refraction than the second dielectric material, and wherein each layer of the second dielectric material has an optical thickness which is greater than a corresponding optical thickness of the underlying layer of the first dielectric material upon which the layer of the second dielectric material is stacked, said optical thicknesses being selected to establish a high reflectance region in which greater than 95% of UV light having a wavelength of 350 nm to 400 nm is reflected by the optical element and a low reflectance region in which less than 2% of visible light having a wavelength of 450 nm to 700 nm is reflected by the optical element.

15. An optical element according to claim 14 wherein an $i^{th}$ layer stacked upon the first surface of said optical substrate has an optical thickness which is greater than the optical thickness of an $(i-4)^{th}$ layer stacked upon the first surface of said optical substrate for a positive integer i of 5, 7, 9 and 11.

16. An optical element according to claim 15 wherein the $i^{th}$ layer and the $(i-4)^{th}$ layer are each comprised of the first dielectric material.

17. An optical element according to claim 14 wherein said at least eight alternating layers comprises an odd number of alternating layers of the first dielectric material and the second dielectric material such that both the innermost layer and the outermost layer are comprised of the first dielectric material.

18. An optical element according to claim 17 wherein the outermost layer has an optical thickness which is less than the corresponding optical thickness of any of the other layers of the first and second dielectric materials.

19. An optical element according to claim 14 wherein said optical substrate is comprised of a material selected from the group consisting of glass, plastic and metal.

20. An optical element according to claim 19 wherein said optical substrate is comprised of a material having an intermediate index of refraction between the respective indices of refraction of the first and second dielectric materials.

21. An optical element according to claim 14 wherein the first material is selected from the group consisting of $TiO_2$, $ZrO_2$ and $Ta_2O_5$ and wherein the second material is selected from the group consisting of $MgF_2$ and $SiO_2$.

* * * * *

UNITED STATES PATENT AND TRADEMARK OFFICE
CERTIFICATE OF CORRECTION

PATENT NO. : 5,933,273

DATED : August 3, 1999

INVENTOR(S) : Ferrante et al.

It is certified that error appears in the above-identified patent and that said Letters Patent is hereby corrected as shown below:

Column 9, line 51, "ed" should read --comprised--.

Column 11, in the third sub-heading of the table, cancel "Range of".

Signed and Sealed this

First Day of February, 2000

*Attest:*

Q. TODD DICKINSON

*Attesting Officer*          *Acting Commissioner of Patents and Trademarks*